United States Patent
Hellberg

(10) Patent No.: US 8,254,478 B2
(45) Date of Patent: Aug. 28, 2012

(54) METHOD FOR LIMITING LOCAL BANDWIDTH IMPAIRMENT USING TONE RESERVATION

(75) Inventor: Richard Hellberg, Huddinge (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 768 days.

(21) Appl. No.: 12/442,776

(22) PCT Filed: Nov. 13, 2006

(86) PCT No.: PCT/SE2006/050467
§ 371 (c)(1),
(2), (4) Date: Mar. 25, 2009

(87) PCT Pub. No.: WO2008/060202
PCT Pub. Date: May 22, 2008

(65) Prior Publication Data
US 2010/0008442 A1    Jan. 14, 2010

(51) Int. Cl.
*H04L 27/28* (2006.01)

(52) U.S. Cl. ........ 375/260; 375/296; 375/285; 375/295; 375/297; 455/504; 455/67.13; 455/114.2; 455/114.3

(58) Field of Classification Search .......... 375/260, 375/295, 285, 296, 297; 455/501, 67.13, 455/114.2, 114.3
See application file for complete search history.

(56) References Cited

U.S. PATENT DOCUMENTS

| 6,687,511 | B2* | 2/2004 | McGowan et al. | 455/522 |
| 2005/0063485 | A1* | 3/2005 | Hasegawa et al. | 375/296 |
| 2005/0089109 | A1* | 4/2005 | Yun et al. | 375/260 |
| 2006/0030352 | A1* | 2/2006 | Kiran et al. | 455/522 |

(Continued)

FOREIGN PATENT DOCUMENTS
EP    1662737 A2    5/2006

OTHER PUBLICATIONS

Krongold, B.S., et al., "A New Tone Reservation Method for Complex-Baseband Par Reduction in OFDM Systems", Acoustics, Speech and Signal Processing, 2002 Proceedings (ICASSP '02) IEEE International Conference on, vol. 3, pp. III-2321-III-2324, Section 3, Tone Reservation.

Krongold, B.S., et al., "PAR Reduction in OFDM via Active Constellation Extension" Acoustics, Speech, and Signal Processing, 2003, Proceedings, (ICASSP '03), 2003 IEEE International Conference on, vol. 4, pp. IV-525-8, Apr. 6-10, 2003, Section V-A, Constellation Effect.

Office Action issued in corresponding European Patent Application No. 06 813 087.1 on Feb. 22, 2012, 4 pages.

*Primary Examiner* — Kenneth Lam
(74) *Attorney, Agent, or Firm* — Rothwell, Figg, Ernst & Manbeck, P.C.

(57) ABSTRACT

The present invention relates to a method of limiting local bandwidth impairment in a telecommunications system, wherein tone reservation is used to reduce peak power of a multi-carrier signal using successive processing stages. The present invention also relates to an apparatus for limiting local bandwidth impairment and to a base station including such an apparatus. The method according to the present invention comprises the steps: generating a first peak reduction signal using reserved frequencies or tones of a first subset of frequencies or tones; generating a second peak reduction signal using reserved frequencies or tones of a second subset of frequencies or tones; extracting the In-phase components, I-components, of the first peak reduction signal and extracting the Quadrature components, Q-components, of the second peak reduction signal; and generating a third peak reduction signal by combining or adding, in the frequency domain, the I-components of the first peak reduction signal and the Q-components of the second peak reduction signal.

19 Claims, 8 Drawing Sheets

U.S. PATENT DOCUMENTS

| | | | |
|---|---|---|---|
| 2006/0115010 A1* | 6/2006 | Rog et al. | 375/260 |
| 2007/0121483 A1* | 5/2007 | Zhang et al. | 370/208 |
| 2007/0140367 A1* | 6/2007 | Braithwaite | 375/260 |
| 2007/0171994 A1* | 7/2007 | Parker et al. | 375/260 |

* cited by examiner

METHOD FOR LIMITING LOCAL BANDWIDTH IMPAIRMENT USING TONE RESERVATION

CROSS REFERENCE TO RELATED APPLICATION

This application is a 35 U.S.C. §371 National Phase Application from PCT/SE2006/050467, and designating the United States.

TECHNICAL FIELD

The present invention relates to signal processing in general and to a method and apparatus for limiting local bandwidth impairment in a telecommunications system in particular.

BACKGROUND

In various multi-carrier modulation systems, e.g. Orthogonal Frequency Division Multiplexing (OFDM) or Discrete Multi-tone (DTM), multi-carrier signals suffer from a high peak to average power ratio. A large Peak-to-Average-Ratio (PAR) brings disadvantages like a reduced efficiency and lower average output power of a power amplifier (PA). The objective of PAR reduction techniques, such as clipping or decresting, is therefore to reduce the peak amplitude excursions of the output signal while keeping the spectrum expansion within specified limits, such as spectral mask and adjacent channel power ratio (ACPR) specifications, and keeping in-band error within specified limits, so-called error vector magnitude (EVM) specification. PAR reduction thus increases efficiency and average output power of a peak power limited power amplifier.

There are many existing prior art solutions dealing with PAR reduction for multi-carrier signals e.g. OFDM signals.

A well known prior art approach for reducing the peak power of a multi-carrier signal is to implement Tone Reservation, also known as Tone Reduction. In this method, described in J. Tellado-Mourello, "Peak to Average Reduction For Multicarrier Modulation" Dept. of Electrical Engineering of Standford University, pp. 66-99, September 1999, the peak power is reduced by selecting or reserving a subset of a plurality of frequencies or tones that make up a multi-carrier symbol. These selected or reserved frequencies are used to create an approximate impulse function, also known as a kernel.

FIG. 1 illustrates the prior art technique for reducing peak power of an input main signal using a kernel signal. In FIG. 1 an input multi-carrier signal composed of $\{X_0, X_1, \ldots X_{N-1}\}$ originally in a frequency domain is converted into a time-discrete domain signal denoted x(n) using an N-point Inverse Fast Fourier Transformer. N is the number of sub-carriers of the original input signal and N can take any value depending on the desired data rate and other requirements on the system which the apparatus is to be integrated with. As can be seen in FIG. 1, some sub-carriers $X_i$ are equal to zero. These sub-carriers are the reserved tones used to reduce the peak power of the system. These reserved sub-carriers or tones are usually not used for data transmission instead they are reserved for anti peak signals and they are orthogonal to the other tones which carry data. The reserved tones are further used to construct a reduction signal $\{C_1, C_2, \ldots C_{N-1}\}$ which is further passed through an N-point Inverse Fast Fourier Transformer in order to generate a time-discrete domain signal c(n) of similar size as x(n), i.e. having the same number of samples as x(n), and adding this signal c(n) to the original time domain signal x(n) to cancel large peaks. This tone reservation technique restricts the data block $\{X_0, X_1, \ldots X_{N-1}\}$ and peak reduction block signal $\{C_1, C_2, \ldots C_{N-1}\}$ to lie in disjoint frequency subspaces i.e. $X_k C_k = 0$. This is illustrated in FIG. 1 where $\{C_1, C_2, \ldots C_{N-1}\}$ has zero values when $\{X_0, X_1, \ldots X_{N-1}\}$ has non-zero values and vice versa.

An exemplary process of reducing a single peak of x(n) exceeding a threshold level A will now be described:

An appropriate kernel k(n) is constructed from peak reduction frequencies or similarly from the reserved frequencies described above.

This kernel k(n) is further scaled at a peak time value $\tau$ using a scaling factor $\Delta$, and rotated such that its phase matches the phase of the overshooting part exceeding threshold level A.

The scaling factor $\Delta$ corresponds to the magnitude of the overshooting part exceeding a threshold level A, and $\tau$ corresponds to the peak time-discrete value.

Now, to reduce the peak of x(n) at time $\tau$, c(1) is constructed according to: $c(1) = A_1(\Delta) \cdot k(n-\tau)$, where $A_1(\Delta)$ is a scaling factor greater than $\Delta$ such as for example $1.3\Delta$. Thus, when x(n) and c(1) are added at $n=\tau$ would the maximum value be $A-1.3\Delta$, which results in a value less than the threshold level, and the peak has therefore been reduced.

The tone reservation technique described above repeatedly applies the kernel to cancel the peaks of the input signal. Thus, any number of peaks may be clipped in this fashion and in a single iteration. However, reducing one or more peaks may cause the resulting waveform to exceed maximum threshold value A at other sample positions. Therefore, the process may be repeated until a desired peak power is reached.

The kernel created from the subset of reserved frequencies are usually pre-computed since the subset of reserved frequencies is usually known in advance. The method described above is usually performed within each multi-carrier symbol (block). In case the multi-carrier signal is an OFDM signal, the above described PAR reduction method is usually performed within each OFDM symbol, before application of cyclic prefixes (or guard bands) and other transmit processing operations.

The basic idea of reducing the peak power using a kernel created from reserved frequencies of the multi-carrier signal is attractive and does really reduce the peak power, especially if the percentage of reserved frequencies is high. However, a high percentage of reserved frequencies impairs the channel since more bandwidth is lost for peak reduction purposes. Furthermore, the power in the reserved frequencies or tones adds to the average signal power without contributing to the data transfer. For this reason, it is beneficial to use a low percentage of reserved frequencies for certain channel conditions. For example, if the signal to noise ratio (SNR) of a channel is high, there is no need to use a high percentage of reserved frequencies.

In addition to the percentage of frequencies or tones that are used, the distribution of the tones is also important. In practical designs, generally random or irregular distributions of the reserved tones perform much better than evenly or regularly spaced tones or tones clustered in blocks. Although the best tone distributions are irregular or random, the error energy or clipping error and local bandwidth impairment will be unevenly distributed across the system bandwidth.

This uneven distribution of local bandwidth impairment is especially noticeable for systems wherein the available system bandwidth is divided into contiguous portions of frequencies, whereas varying number of portions are assigned to users. In such systems, some portions will have one or several reserved frequencies in it and some will not. For those users that are assigned portions that have different numbers of reserved tones in it will therefore experience different qualities of service i.e. degradation in quality of service and lower data transfer date since several reserved tones can be a significant part of the data-carrying capacity.

SUMMARY

As stated above, a general problem with prior art solutions is that the error energy and local bandwidth impairment are unevenly distributed across the system bandwidth. This results in degradation in qualities of service experienced by users of the system and this also results in lower data transfer rate.

An object of the present invention is thus to provide a method and apparatuses for limiting local bandwidth impairment in a telecommunication system wherein tone reservation is used to reduce peak power of a multi-carrier transmit signal.

According to a first aspect of the present invention, the above stated problem is solved by means of a method of limiting local bandwidth impairment in a telecommunication system wherein tone reservation is used to reduce peak power of an input main multi-carrier signal using successive processing stages. The method comprises for each stage the steps of: generating a first peak reduction signal using reserved frequencies or tones of a first subset of frequencies or tones; generating a second peak reduction signal using reserved frequencies or tones of a second subset of frequencies or tones; extracting the In-phase components, I-components, of the first peak reduction signal and the Quadrature components, Q-components, of the second peak reduction signal and generating a third peak reduction signal by combining or adding, in the frequency domain, the I-components of the first peak reduction signal and the Q-components of the second peak reduction signal.

According to a second aspect of the present invention, the above stated problem is solved by means of an apparatus comprising successive processing stages, for limiting local bandwidth impairment in a telecommunication system wherein tone reservation is used to reduce the peak power of an input main multi-carrier signal. Each stage of the apparatus comprises: a first frequency/tone reservation unit adapted to generate a first peak reduction signal using reserved frequencies or tones of a first subset of frequencies or tones; a second frequency/tone reservation unit adapted to generate a second peak reduction signal using reserved frequencies or tones of a second subset of frequencies or tones; a component extractor adapted to extract the In-phase components, I-components, of the first peak reduction signal and adapted to extracted the Quadrature components, Q-components, of the second peak reduction signal; and a combiner or adder adapted to generate a third peak reduction signal by combining or adding, in the frequency domain, the I-components of the first peak reduction signal and the Q-components of the second peak reduction signal.

According to a third aspect of the present invention, the above stated problem is solved by means of a base station, which base station comprises an apparatus that limits local bandwidth impairment in a telecommunication system wherein tone reservation is used to reduce peak power of a multi-carrier signal.

An advantage with the present invention is that the local bandwidth impairment and unused carrier power from the reserved frequencies or tones is spread more evenly across the system bandwidth.

Another advantage with the present invention is that each reserved frequency or tone utilizes only half the bandwidth of a reserved frequency or tone.

A further advantage of the present invention is that users in the telecommunications system will experience less degradation in qualities of service.

Yet another advantage of the present invention is that local bandwidth impairment is limited in both systems with subdivision of the available bandwidth in contiguous portions of frequencies or tones and system without subdivision.

To the accomplishment of the above and relates objects, this present invention may be embodied in the form of illustrated in the accompanying drawings, attention being called to the fact, however, that the following drawings are illustrative only, and that changes may be made in the specific embodiments illustrated and described within the scope of the appended claims.

DETAILED DESCRIPTION

The present invention provides a method and apparatuses for limiting local bandwidth impairment in a telecommunications system wherein tone or frequency reservation is used to reduce peak power of a multi-carrier signal. The method and apparatuses according to the present invention effectively and more evenly distribute the resulting local bandwidth impairment and reserved tone energy such that users in a telecommunications system will not experience different qualities of service. This is achieved through generation of a peak reduction signal that is composed of the In-phase components of a first peak reduction signal and the Quadrature components of a second peak reduction signal. The first peak reduction signal is generated using reserved frequencies of a first subset of frequencies or tones, and the second peak reduction signal is generated using reserved frequencies of a second subset of frequencies or tones that is different from the first subset of tones. In this way it is possible to keep one of the signal components of a reserved tone in the first respectively the second subset of tones for sending data while the other signal components are used, by the peak reduction signal, to reduce the peak power of a transmit signal.

Figure 1:
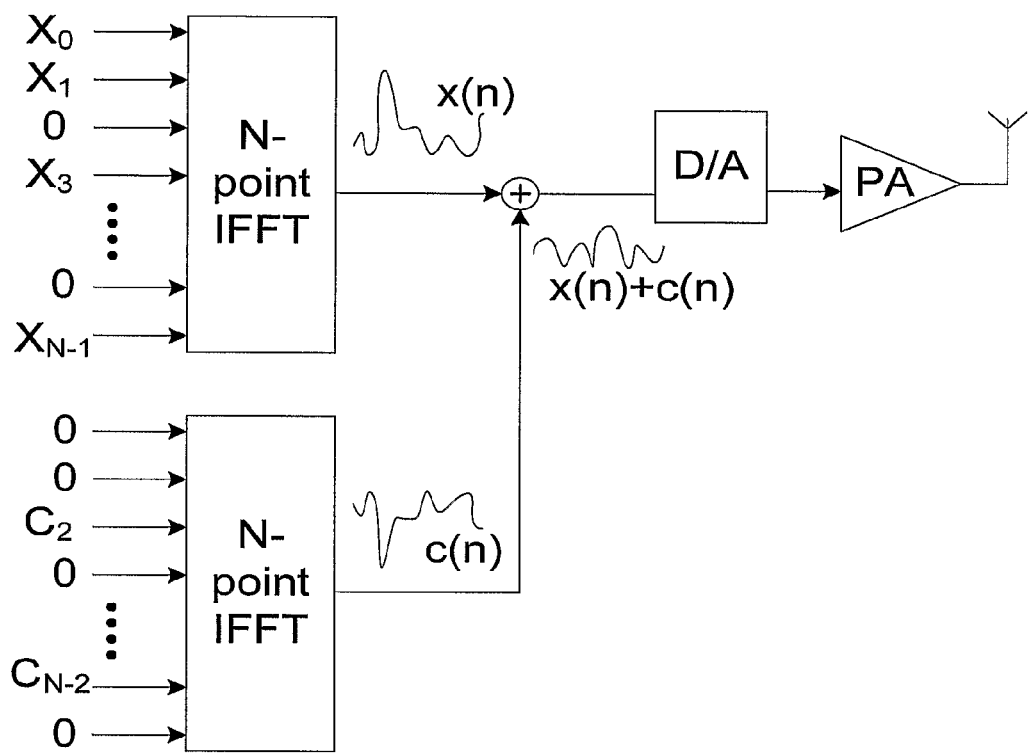
FIG. 1 is a schematic block diagram of an exemplary prior art apparatus for reducing peak power using a kernel constructed based on reserved frequencies.

The process of reducing peaks of a multi-carrier signal by applying a kernel constructed from peak reduction frequencies or similarly from reserved frequencies or tones has been described earlier in conjunction with FIG. 1. In this prior art approach, a low percentage of reserved frequencies is generally used together with a random or irregular distribution of the reserved frequencies or tones. As mentioned before, by using a low percentage of reserved frequencies, less bandwidth is lost for peak reduction purposes, whereas a random or irregular distribution of the reserved frequencies has in practical designs proved to perform much better than evenly spaced frequencies (or tones) or tones clustered, i.e. sequentially grouped in symbols that are to be transmitted.

Although a low percentage of tones is used and a random distribution of the tones is selected, the kernel is, in the prior art, still constructed from all reserved tones at equal amplitude, and all with the same phase, so the kernel is not aware of the I-components and Q-components of the signal it is applied to. In addition, the rotation of the kernel for each time a peak of the multi-carrier signal is reduced means that the clipping error, (i.e. the overshooting part exceeding a predetermined threshold), will be placed at all phases randomly for all frequencies of the main multi-carrier signal.

According to embodiments of present invention which will now be described, the resulting local bandwidth impairment and the error energy from tone reservation is, as mentioned above, more evenly distributed so as to limit local bandwidth deterioration.

Hereinafter, exemplary embodiments of the present invention will be described with reference to an overview of an orthogonal frequency division multiplexing (OFDM) transmitter. However, the present invention is not restricted to an OFDM system. The present invention may also apply to other types of communication systems utilizing multi-carriers. By way of example, the present invention applies to discrete multi-tone (DMT), discrete wavelet multi-tone (DWMT), Asymmetrical Digital Subscriber Line (ADSL), Digital Audio Broadcasting (DAB) or Digital Video Broadcasting (DVB) communications systems.

Figure 2:
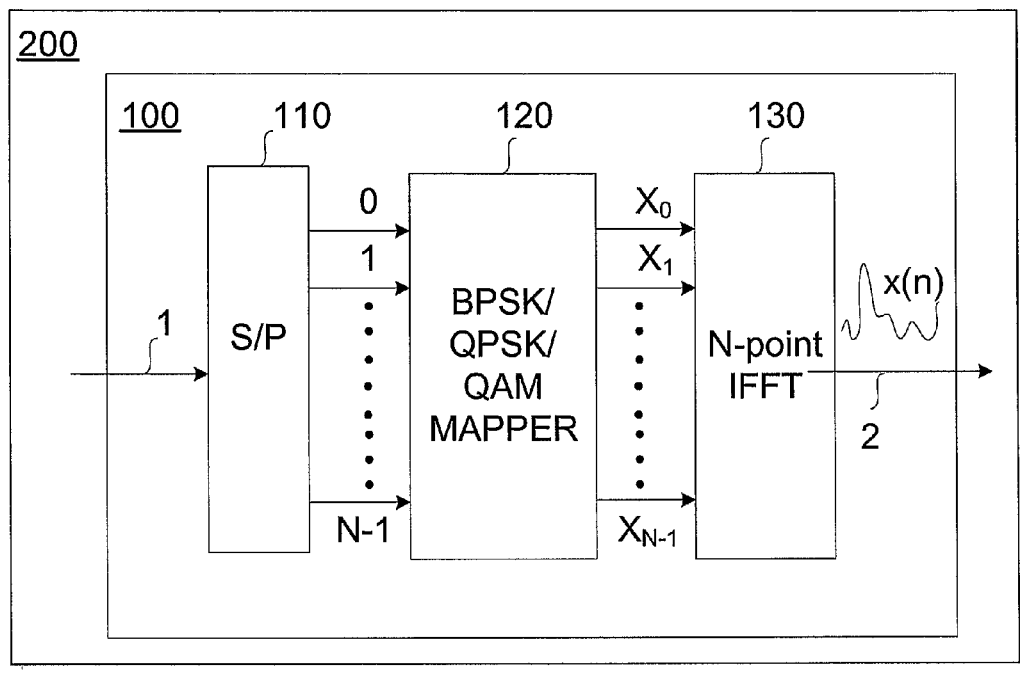
FIG. 2 is a schematic block diagram of an exemplary part of a prior art OFDM transmitter capable in generating a multi-carrier signal.

FIG. 2 is a diagram illustrating architecture of a typical part 100 of a prior art OFDM transmitter 200, capable of generating a multi-carrier signal. Note that transmitter 200 of FIG. 2 includes other elements or signal processing parts, such as a digital to analogue converter, a guard interval inserter and so on.

In FIG. 2, N tones, also known as sub-carriers, are utilized for transmission (denoted 0, 1, ..., N−1). The input serial data 1 is converted into N parallel data in a serial to parallel converter 110. Thereafter, each of the N parallel data paths are passed through a binary phase shift keying (BPSK) mapper or a Quadrature phase shift keying (QPSK) mapper or a M-ary quadrature amplitude modulation (QAM) mapper 120. The BPSK/QPSK/QAM mapper 120 encodes each data path into a complex number, $X_1$, (i=0, ..., N−1), which represents the In-phase component (I-component) and the Quadrature component (Q-component) for its respective tone or sub-carrier. An N-points inverse fast Fourier transform (IFFT) module 130 is used to convert the multi-carrier signal composed of $\{X_0, X_1, ..., X_{N-1}\}$, into a time-discrete domain multi-carrier signal denoted x(n) (labeled 2 in FIG. 2).

Figure 3:
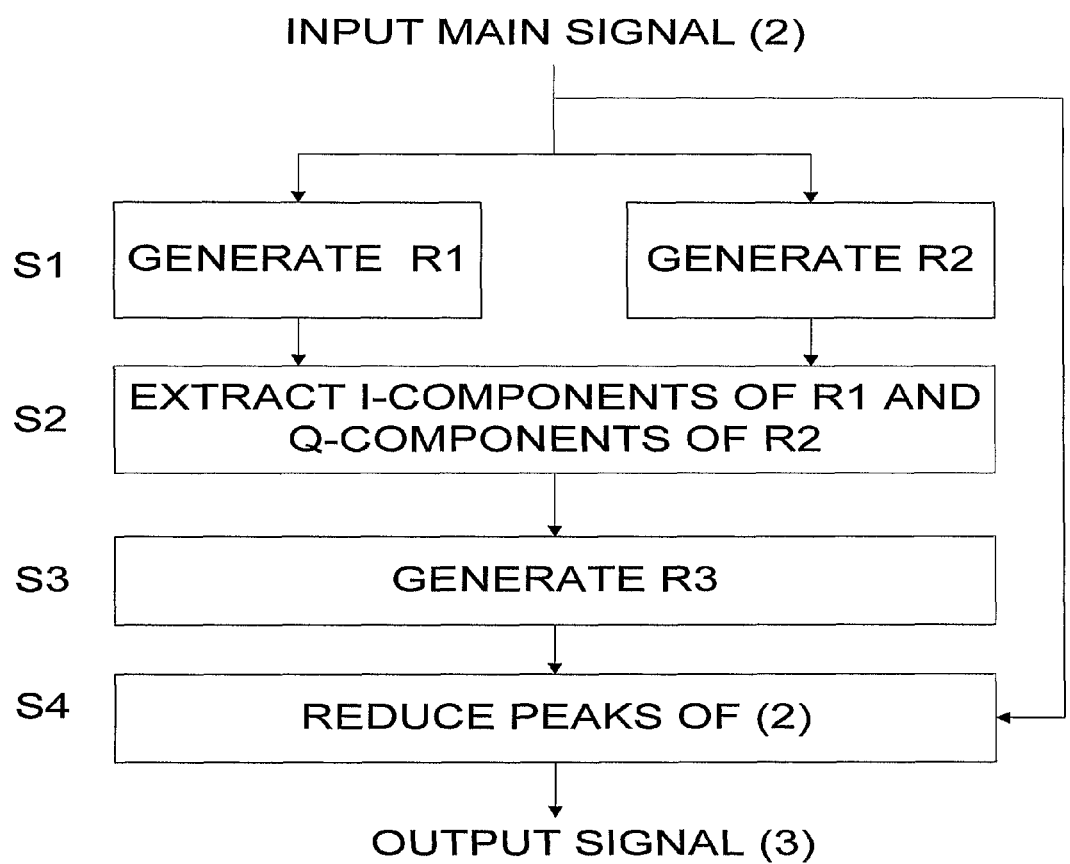
FIG. 3 is a flowchart of a method of limiting local bandwidth impairment according to the present invention.

Referring to FIG. 3 there is illustrated a flowchart of a method of limiting local bandwidth impairment in a telecommunications system wherein tone reservation is used to reduce peak power of a multi-carrier signal, e.g the multi-carrier signal 2 using successive processing stages in accordance with a first aspect of the present invention.

At step S1 two subset of frequencies or tones T1 and T2 are reserved, whereas a first peak reduction signal R1 is generated using the frequencies or tones of subset T1, and a second peak reduction signal is generated using the reserved frequencies or tones of subset T2.

The reserved tones or frequencies may be chosen by any suitable method. As an example, frequencies that are noisy may be utilized since the decrease in data rate of the output is minimised. The frequencies or tones may also be irregularly and randomly selected. The distribution of the tones is important. In practical designs, generally random distributions of the reserved tones perform much better than evenly spaced tones or tones clustered, i.e. sequentially grouped in symbols that are to be transmitted.

According to embodiments of the present invention, the subsets T1 and T2 of reserved frequencies or tones are chosen prior to transmission. This is done to avoid transmitting any side information to a receiver. In those embodiments no special receiver operation is needed. Alternatively, the subsets of reserved frequencies may be reselected during communication depending on the quality of the channel or for any other reason. In this case, the receiver is informed on or originates the subset of reserved frequencies.

According to preferred embodiments of the present invention, an overshooting part of the input main multi-carrier signal is, prior to generating the first respectively the second peak reduction signals R1 and R2, extracted based on a predetermined threshold level. The threshold level which is also known as clipping level, offset level, limit level or clip level, is defined as the difference between the input transmit signal and the amplitude limited transmit signal. According to an exemplary embodiment of the present invention, information on the extracted overshooting part is determined. This information may comprise the size, the phase and the time position of the overshooting part. The information on the size, phase and time position of the overshooting part may further be used by to manipulate the peak reduction signals R1 and R2 that are made up from the first respectively the second subset of frequencies T1 and T2.

According to this exemplary embodiment of the present invention, this manipulation comprises scaling; rotating and time shifting the first peak reduction signal R1 respectively the second peak reduction signal R2.

According to a second exemplary embodiment of the present invention, the extracted overshooting part of the input signal exceeding a predetermined threshold level is passed through a first filter characterized by the frequencies of the first subset of reserved frequencies or tones T1 and simultaneously passed through a second filter characterized by the frequencies of the second subset of reserved frequencies or tones T2. Thus instead of R1 and R2 being peak reduction signals they instead may be viewed as a first filter mask R1 consisting of the I-components and Q-components of reserved frequencies of the first subset T1, whereas R2 may be viewed as a second filter mask consisting of the I-components and Q-components of reserved frequencies of the second subset T2.

Accordingly, the present invention is not restricted to any particular method of generating peak reduction signals.

It should be noted that in case R1 and R2 are peak reduction signals, the process of generating these peak reduction signals may be performed in a time domain or in a frequency domain.

Note also that the process of extracting an overshooting part or peak of a signal exceeding a predetermined threshold level is well know to those skilled in the art, and the present invention is therefore not restricted to any particular peak extraction process.

Referring back to FIG. 3, at step S2, the In-phase components, I-components, of the first peak reduction signal R1 are extracted and the Quadrature components, Q-components, of the second peak reduction signal R2 are extracted.

At step S3, a third peak reduction signal R3 is generated by combining or adding, in the frequency domain, the In-phase components of the first peak reduction signal R1 and the Quadrature components of the second peak reduction signal R2. The peak reduction signal R3 is further used, at step S4, to reduce at least one peak of the input main signal 2 by generating an output signal 3 through combination of the input main signal 2 or a delayed version of the input main signal with the third peak reduction signal R3. The output signal 3 is further used as an input main signal to a subsequent stage.

Again and in accordance with embodiments of the present invention R3 may be viewed as a filter mask that consists of the extracted I-components of R1 and the extracted Q-components R2.

It should also be noted that in case the input main signal 2 is originally in a time domain, the third peak reduction signal R3 must also be in a time domain or converted into a time domain signal before combining it with the input main signal 2 or a delayed version of the input main signal. A delayed version of the input signal is, according to embodiments of the present invention, preferably used because the processing performed prior to generating the peak reduction signal R3 takes some time.

According to embodiments of the present invention, the signal components (I-components or Q-components) of the first subset of frequencies T1 and the signal components of the second subset of frequencies T2 that are not used to generate the third peak reduction signal R3 are instead used to carry data. The I-components of subsets T1 and T2 and the Q-components of subsets T1 and T2 are also here denoted the I part halftones of subsets T1 and T2 and the Q part halftones of subsets T1 and T2.

Thus, if the I part halftones of the first subset T1 of the reserved frequencies are used to construct the third peak reduction signal R3, the Q part halftones of subset T1 may instead be used to carry data.

Similarly, if the Q part halftones of the second subset T2 of reserved frequencies are used to construct the peak reduction signal R3, the I part halftones of subset T2 may instead be used to carry data. For the rest of the frequencies or tones, which are neither part of subset T1 nor subset T2, both the I-components and the Q-components are used to carry data.

According to embodiments of the present invention, each reserved frequency or tone in subsets T1 and T2 therefore uses only half the bandwidth compared to the tone reservation of prior art systems.

The use of only half the bandwidth of a reserved tone is especially important in systems wherein the available system bandwidth is divided into contiguous portions of frequencies, whereas varying numbers of portions are assigned to users. In such systems, and according to embodiments of the present invention, the local bandwidth impairment for each portion with a reserved tone in it is reduced to half that of prior art tone reservation schemes, thus resulting in less unevenness in the frequency response on the reserved tones. In addition, the error energy that leaks from/to adjacent tones or channels when using only half the bandwidth of a reserved tone is reduced by approximately 3 dB compared to that of prior art tone reservation schemes.

Accordingly, the local bandwidth impairment and unused carrier power from the reserved halftones is, according to the present invention, twice as evenly distributed across the system bandwidth, and thus local bandwidth impairment is effectively limited in those systems.

The use of only half the bandwidth of a reserved tone is, according to the present invention, also beneficial in systems without subdivision of the available system bandwidth, because the local bandwidth impairment and unused carrier power from the reserved halftones is also here distributed more evenly across the system bandwidth.

Note that in order to achieve similar peak reduction performance as in prior art systems; the double amount of halftones should be reserved compared to the number of tones in prior art systems. As an example, if ten reserved tones are used in prior art peak reduction systems, twenty halftones distributed in two different subsets should be reserved in accordance with the present invention in order to achieve the same peak reduction performance as in prior art systems. However, each reserved halftone, according to the present invention, will contain on average half the power of a reserved tone in the prior art system.

Figure 4:
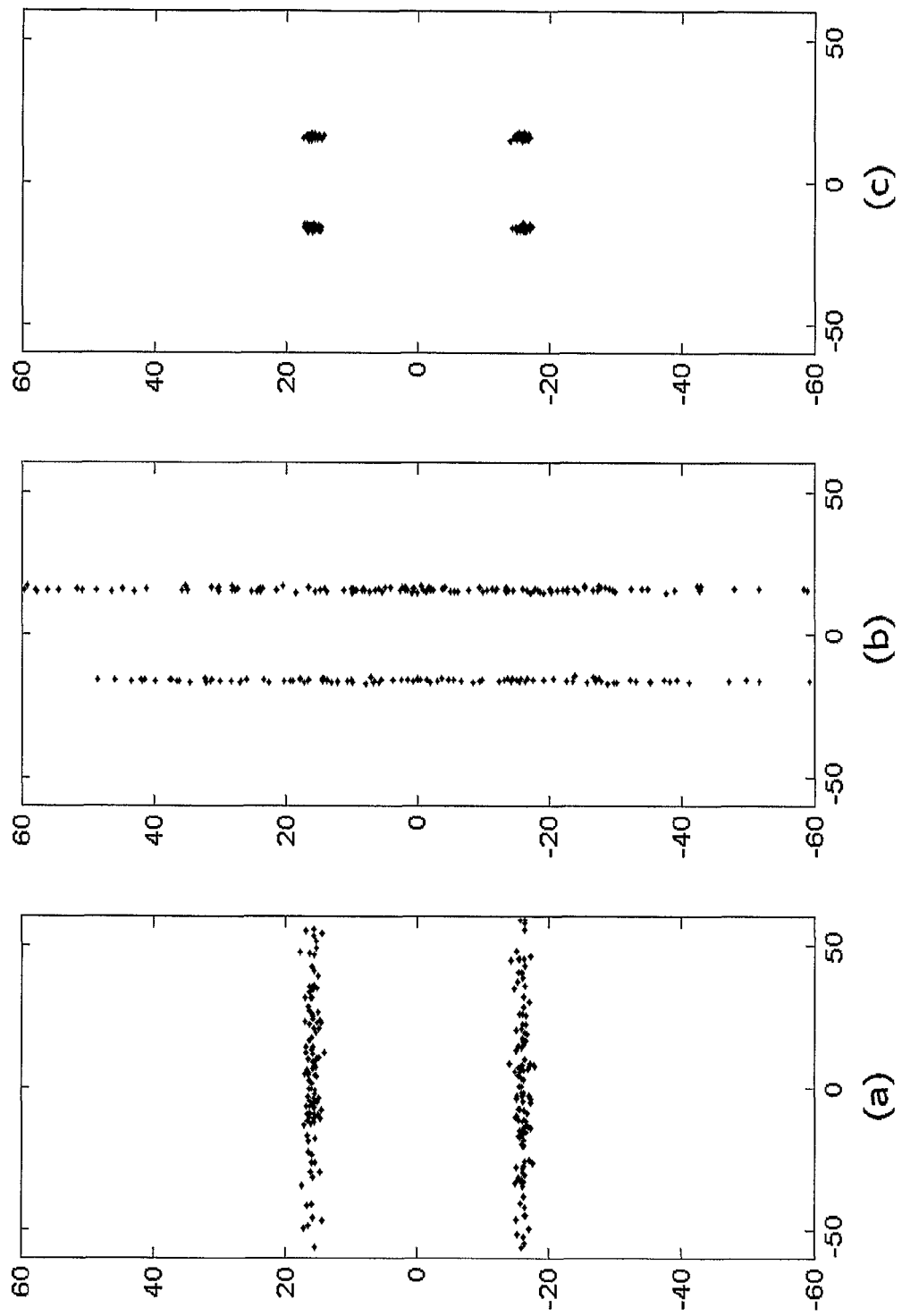
FIG. 4 illustrates an example of the constellations for the Q part reserved halftones (data in the I part reserved halftones); I part reserved halftones (data in the Q part reserved halftones), and pure data tones according to an exemplary embodiment of the present invention.

FIG. 4 illustrates an example of the constellations for the Q part reserved halftones of a subset of reserved frequencies T2 wherein data is carried on the I part reserved halftones of the same subset T2; the I part reserved halftones of a subset of reserved frequencies T1 wherein data is carried on the Q part reserved halftones of the same subset T1, and pure data tones. The horizontal axel corresponds to the In-phase component (I) axel and the vertical axel corresponds to the Quadrature component (Q) axel.

Shown in the leftmost pane (a), is an exemplary 2-ASK (amplitude shift keying) constellation in the Q part reserved halftones of subset T2, with the I part reserved halftones of the same subset T2 left free for placing data. In the middle pane (b), a 2-ASK constellation is used in the I part reserved halftones of subset T1, with the Q part reserved halftones of the same subset T1 left free for placing data. The rightmost pane (c) illustrates the 4-QAM (Quadrature amplitude modulation) constellation of the pure data tones. As can be seen from the leftmost pane (a) and the middle pane (b), the signal distributions of the reserved halftones in the I and Q directions are random.

Figure 5:
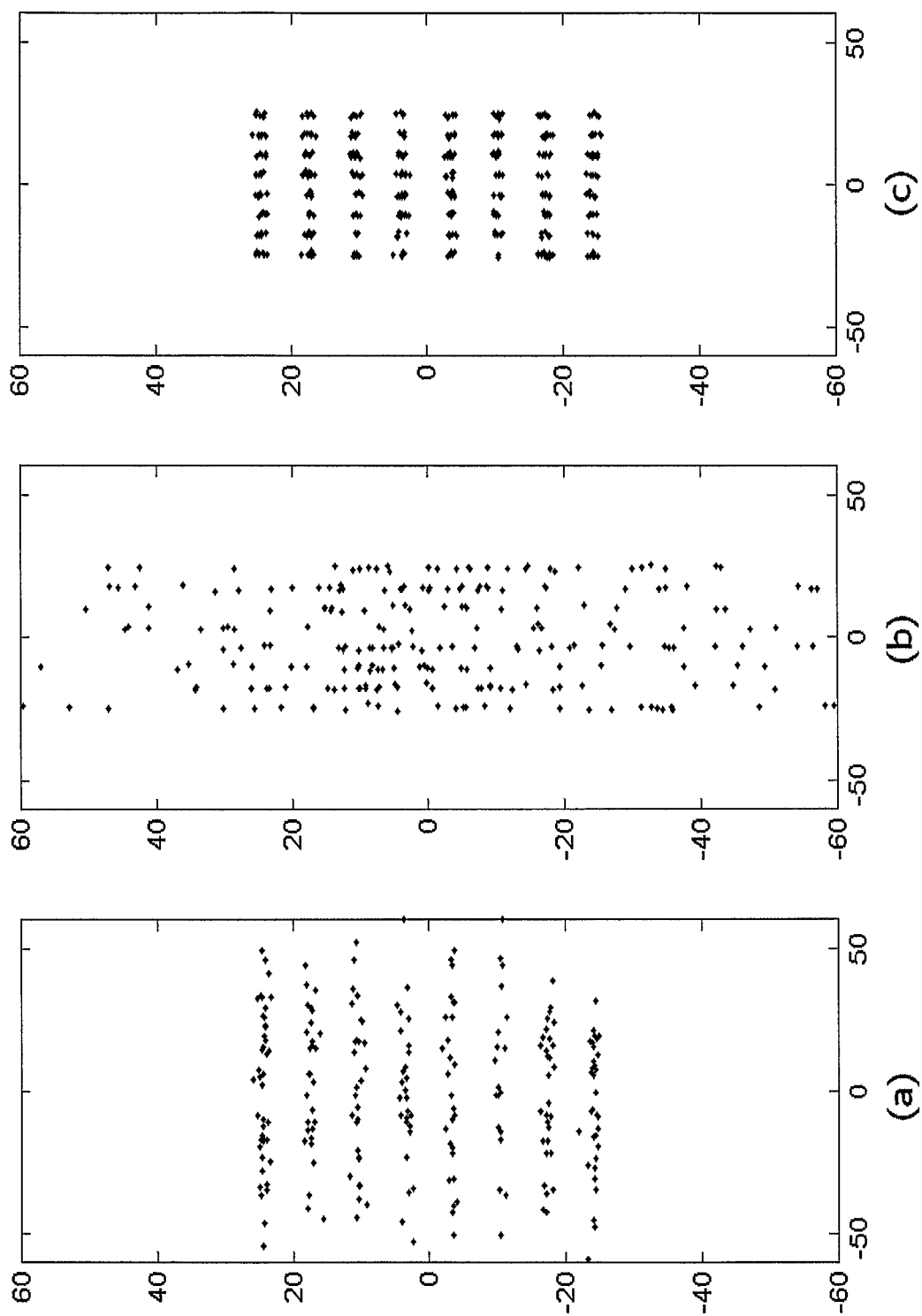
FIG. 5 illustrates another example of the constellations for the Q part reserved halftones (data in the I part reserved halftones); I part reserved halftones (data in the Q part reserved halftones), and pure data tones according to another exemplary embodiment of the present invention.

FIG. 5 illustrates another example of the constellations for the Q part reserved halftones of a subset T2 of reserved frequencies wherein data is carried on the I part reserved halftones of the same subset T2; the I part reserved halftones of a subset T1 of reserved frequencies wherein data is carried on the Q part reserved halftones of the same subset T1, and pure data tones with a higher number of bits per tone.

Shown in the leftmost pane (a), is an exemplary 8-ASK constellation in the Q part reserved halftones of subset T2, with the I part reserved halftones of the same subset T2 left free for placing data. In the middle pane (b), a 8-ASK constellation is used in the I part reserved halftones of subset T1, with the Q part reserved halftones of the same subset T1 left free for placing data. The rightmost pane (c) illustrates the 64-QAM (Quadrature amplitude modulation) constellation of the pure data tones. As can be seen from the leftmost pane (a) and the middle pane (b), the signal distributions of the reserved halftones in the I and Q directions are also here random.

According to an embodiment of the present invention, the distributions for both I part reserved halftones of subset T1 and Q part reserved halftones of subset T2 are independently or can be independently assigned and irregular. Since in this case the I and Q part halftone distributions are independently assigned, one part can be used to fill in the gaps of the other, so that the resulting local bandwidth impairment and reserved tone energy is more evenly distributed across the system bandwidth.

According to a further embodiment of the present invention, the I part reserved halftones of subset T1 can be a mirrored version of the Q part reserved halftones of subset T2.

According to a further embodiment of the present invention, the I part reserved halftones of subset T1 can be an offset version of the Q part reserved halftones of subset T2.

According to a further embodiment of the present invention, the I part reserved halftones of subset T1 can be distributed to compensate for unevenness of the Q part reserved halftones of subset T2.

Figure 6:
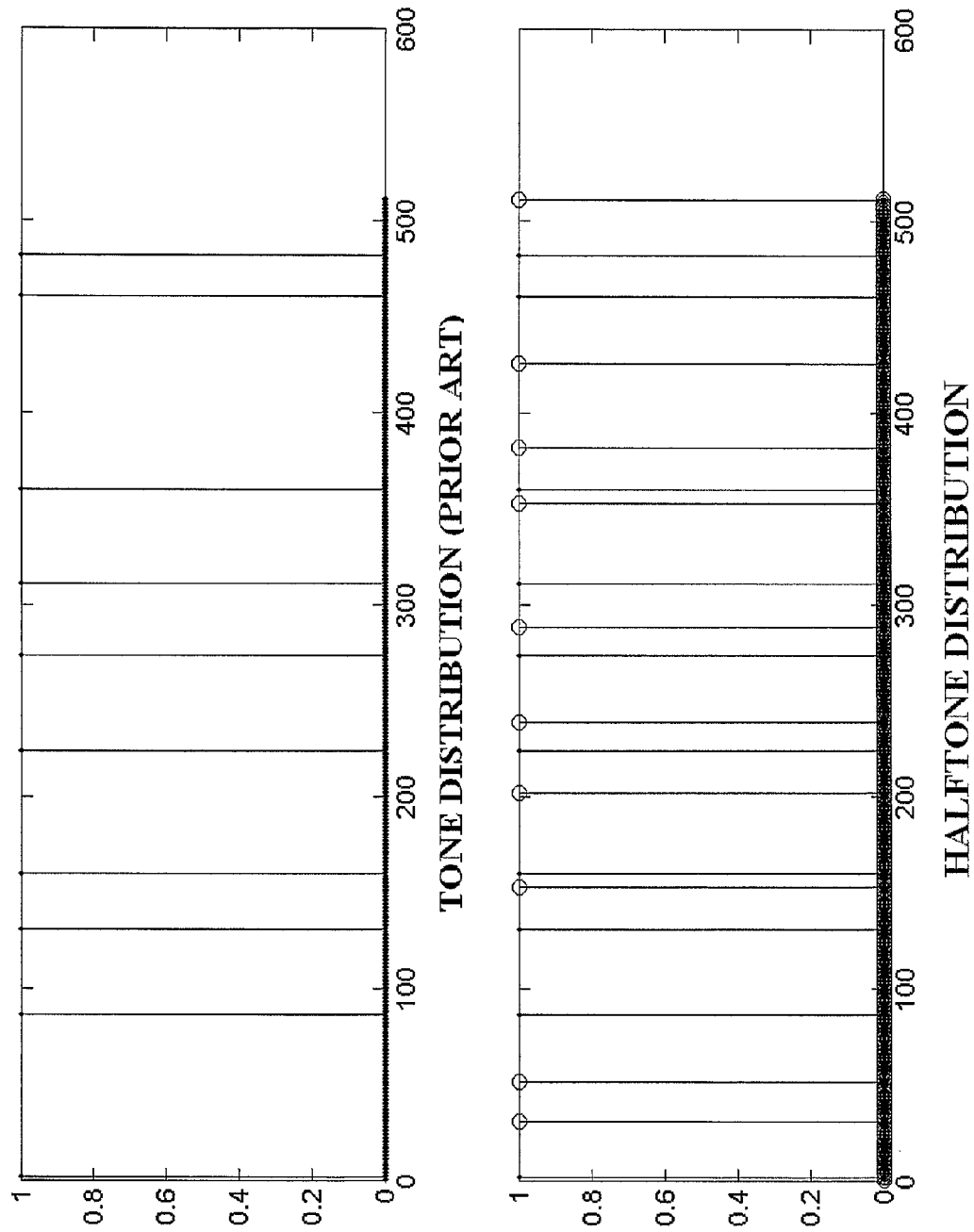
FIG. 6 illustrates two diagrams representing an exemplary distribution of reserved tones according to prior art (top pane) and an exemplary distribution of reserved halftones according to an embodiment of the present invention (bottom pane).

Referring to FIG. 6, there are illustrated two diagrams representing exemplary distributions of reserved tones. The top pane shows a prior art distribution of 10 reserved tones, and the bottom pane shows an exemplary distribution of 20 halftones according to the present invention.

Both the top pane reserved tones and the bottom pane reserved halftones are part of an 512 tones OFDM block.

As can be seen from the bottom pane, the I part halftone distribution (•) is the same as in the prior art reserved tone distribution (•), whereas the Q part halftone distribution (o) is the mirrored version of the I part halftone distribution (•).

It is also clear from the distributions of the I and Q part reserved halftones that they together form a more even distribution of 20 halftones, which in accordance with the present invention will contain on average half the power of a reserved tone and will also distribute more evenly the local bandwidth impairment and unused carrier power across the system bandwidth.

Figure 7:
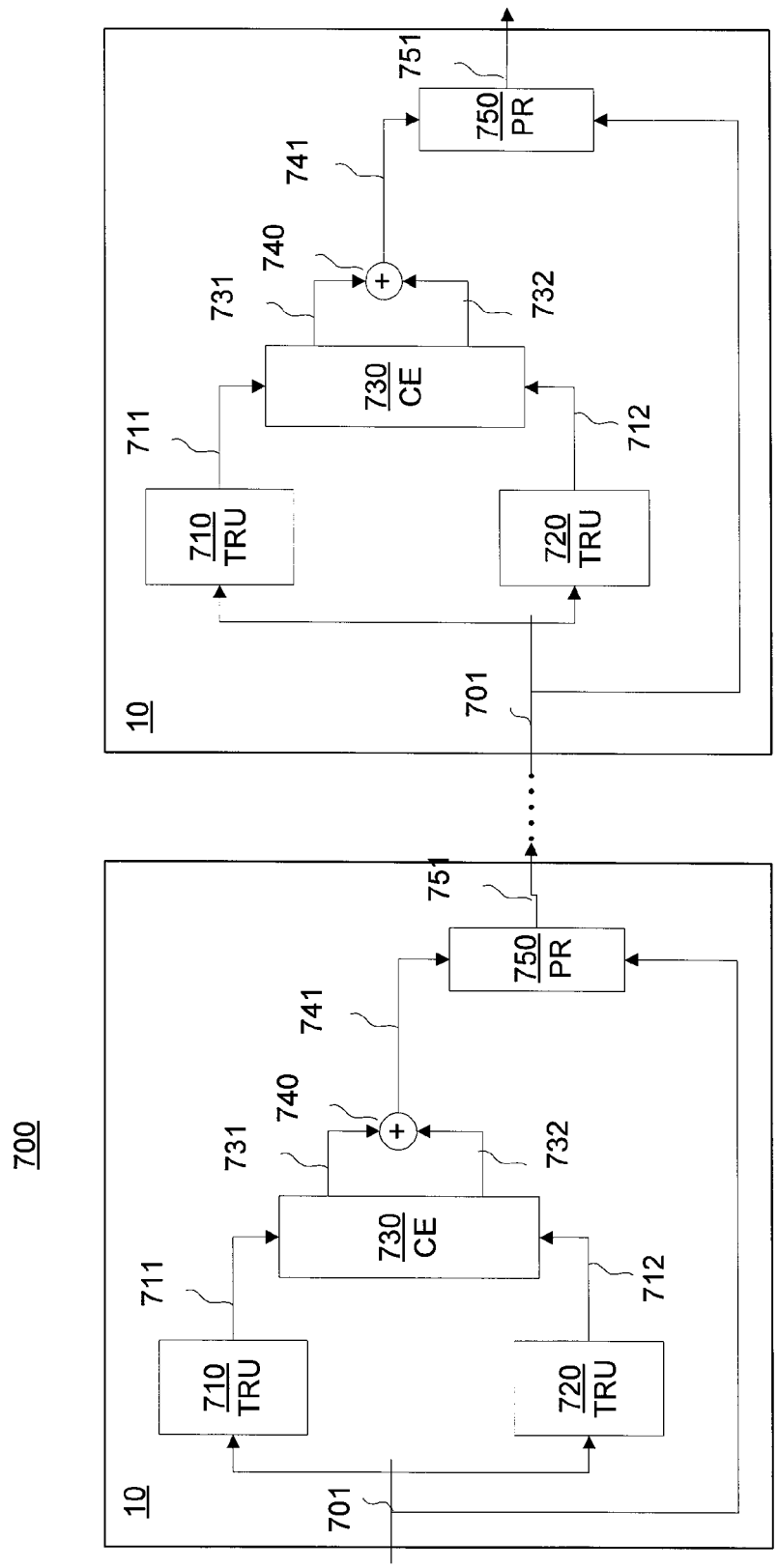
FIG. 7 is a block diagram of an exemplary embodiment of an apparatus for limiting local bandwidth impairment according to the present invention.

Referring to FIG. 7, there is illustrated a schematic block diagram of an apparatus 700 for limiting local bandwidth impairment according to a second aspect of the present invention. As illustrated in FIG. 7, apparatus 700 comprises successive processing stages 10 wherein for each stage 10 a main input multi-carrier signal 701 is used as input to both a first and a second tone reservation unit 710 and 720. Each tone reservation unit 710 and 720 generates a peak reduction signal. According to an embodiment of the present invention, tone reservation unit 710 generates a first peak reduction signal 711 using reserved frequencies or tones of a first subset of frequencies, whereas tone reservation unit 720 generates a second peak reduction signal 712 using reserved frequencies of a second subset of frequencies or tones.

It should be noted that subsets of frequencies or tones are not necessarily reserved in the tone reservation units 710 and 720 instead the subsets of frequencies could be known in advance and in such case information on them are needed by tone reservation units 710 and 720 in order to generate a first respectively a second peak reduction signal. In addition, tone reservation units are not necessarily placed inside each stage 10, instead, these tone reservation units 710 and 720 could be placed outside each stage 10 or even outside apparatus 700.

According to embodiments of the present invention, each tone reservation unit 710 and 720 further comprises a peak extractor or similarly an overshooting part extractor for extracting an overshooting part or peak of the input signal 701 that exceeds a predetermined clipping level. Apparatus 700 further comprises a component extractor 730 that extracts the I-components 731 of the first peak reduction signal 711 and the Q-components 732 of the second peak reduction signal 732.

Note that the process of extracting the I-components and Q-components or the process of extracting an overshooting part of the input signal is well known in the art and the present invention is therefore not restricted to any particular peak or component extraction process.

Also, the present invention is, as mentioned earlier, not restricted to the generation of peak reduction signals 711 and 712, instead the first tone reservation unit 710 may instead be characterized by a filter mask consisting of the signal components of the frequencies or tones of the first subset of reserved frequencies or tones; and the second tone reservation unit 720 may be characterized by a filter mask consisting of the signal components of the frequencies or tones of the second subset of reserved frequencies or tones.

Referring back to FIG. 7, each stage 10 of apparatus 700 further comprises a combiner or adder 740 that is adapted to add or combine, in the frequency domain, the extracted I-components 731 of the first peak reduction signal 711 and the Q-components 732 of the second peak reduction signal 712 thereby generating a third peak reduction signal 741 that is further used by a peak reducer 750 in order to reduce at least one peak of the input main signal 701.

Again and according to embodiments of the present invention, the I-components 732 and the Q-components 732 may be used to characterize a frequency mask that consists of these signal components.

As illustrated in FIG. 7, the output signal 751 from the peak reducer 750 is further used as an input signal 701 to a subsequent stage. The generation of the output signal 751 is performed by combining signal 741 with the input main signal 701 or preferably a delayed version of the input main signal 701. Note that in case a delayed version of the input signal 701 is used, a delay means must either be part of peak reducer 750 or placed on the signal path between the input to each stage and the peak reduced 750 of each stage.

The delay means delays the input signal 701 in order to compensate for the time it takes to generate signal 741.

As mentioned above each output 751 from a single stage 10 is used as input 701 to a subsequent stage 10. The number of stages 10 that are used in apparatus 700 and that are needed to achieve a desired reduction in the peak power depends on several factors, such as the percentage of tones or frequencies that are used for peak reduction relative the number of overall frequencies; the peak to average power ratio; the power in the reserved tones or frequencies relative the power in the non-reserved tones, the bandwidth of the signals; the required accuracy of the output and other factors.

Figure 8:
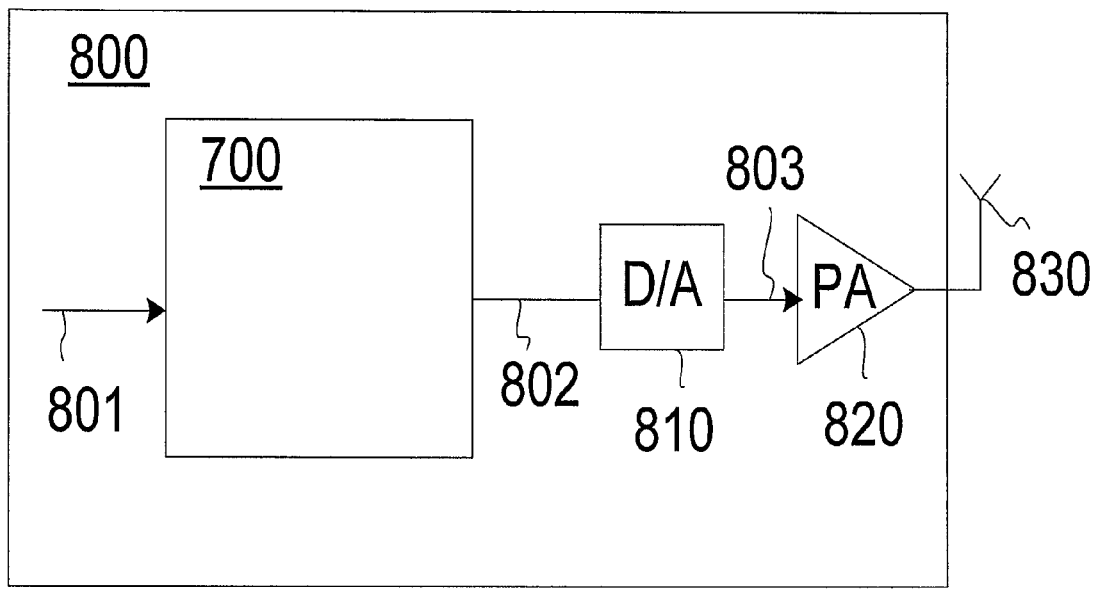
FIG. 8 is a block diagram of an exemplary embodiment of a base station including an apparatus for limiting local bandwidth impairment according to the present invention.

The apparatus 700 for limiting local bandwidth impairment in a telecommunitions system that makes use of tone reservation using successive processing stages in order to reduce peak power of a signal can in accordance with the present invention be implemented in a number of different ways. FIG. 8 illustrates a schematic block diagram of a third aspect of the present invention wherein an exemplary embodiment of a base station 800 includes the apparatus 700 according to the present invention. In FIG. 8, elements that are not necessary to understand the present invention have been omitted, such as for instance modulators, encoders, up-converters, filters and other base station components. According to FIG. 8, an input main multi-carrier signal 801 is forwarded to an apparatus 700 according to the present invention. The output 802 signal from apparatus 700, for limiting local bandwidth impairment, is after it peak/peaks has been reduced further converted into a time continuous signal 803 by passing it through a digital to analogue converter (D/A) 810. The time-continuous signal 802 is subsequently amplified using a power amplifier (PA) 820 and the output from the PA is fed into an antenna 830 prior to transmission.

With the present invention, the local bandwidth impairment and unused carrier power from the reserved tones is effectively and evenly spread across the system bandwidth.

Furthermore, each reserved tone according to the present invention uses only half the bandwidth of a reserved tone in prior art systems. This is an advantage both in systems with subdivision of the spectrum in portions of frequencies and in systems without subdivision of the spectrum.

A person skilled in the art appreciates that the present invention can be realised in many ways. As an example, tone reservation units may instead be integrated into a single tone reservation unit and/or even be integrated in the component extractor which in such case performs the operations of the tone reservation units and the component extraction. The present invention is therefore not restricted to the block diagrams illustrated in the previously described figures. In addition, the apparatus according to the present invention can be realised in hardware with means of digital circuits or as software in a signal processing circuit. Furthermore, the filter masks described in the present invention can be implemented using FIR (Finite Impulse Response) filters, IIR (Infinite Impulse Response) filters, or a combination of FIR and IIR filter structures.

The various illustrative logical blocks described in connection with the embodiments disclosed herein may also be implemented or performed with a general purpose processor, a digital signal processor (DSP), circuits, an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor; the processor may be any conventional processor, processor, microprocessor, or state machine. A processor may also be implemented as a combination of devices, e.g., a combination of a DSP and a microprocessor, a plurality of microprocessors, one or more microprocessors in conjunction with a DSP core, multiple logic elements, multiple circuits, or any other such configuration.

While the invention has been described in terms several preferred embodiments, it is contemplated that alternatives, modifications, permutations and equivalents thereof will become apparent to those skilled in the art upon reading of the specifications and study of the drawings. It is therefore intended that the following appended claims include such alternatives, modifications, permutations and equivalents as fall within the scope of the present invention.

The invention claimed is:

1. A method of limiting local bandwidth impairment in a telecommunications system, wherein tone reservation is used to reduce peak power of a multi carrier signal using successive processing stages wherein, said method comprises the steps of:
    generating a first peak reduction signal using reserved frequencies or tones of a first subset of frequencies or tones and generating a second peak reduction signal using reserved frequencies or tones of a second subset of frequencies or tones;
    extracting the In-phase components, I-components, of said first peak reduction signal and extracting the Quadrature components, Q-components, of said second peak reduction signal;
    generating a third peak reduction signal by combining or adding, in the frequency domain, said I-components of said first peak reduction signal and said Q-components of said second peak reduction signal.

2. The method according to claim 1, further comprising the step of reducing at least one peak of said input main multi-carrier signal exceeding a predetermined threshold level by generating an output signal by combining said third peak reduction signal with said input main multi-carrier signal or a delayed version of said input main multi-carrier signal.

3. The method according to claim 2, wherein said output signal is provided as said input main multi-carrier signal to a subsequent stage of said successive stages.

4. The method according to claim 1, further comprising the step of carrying data on signal components of the reserved frequencies or tones of said first subset and on signal components of the reserved frequencies or tones of said second subset, that are not used to generate said third peak reduction signal.

5. The method according to claim 1, wherein the reserved frequencies or tones of said first subset and the reserved frequencies of said second subset are irregularly and randomly distributed.

6. The method according to claim 1, wherein the distributions of said I-components of said first subset of frequencies or tones and the Q-components of said second subset of frequencies or tones are independently assigned.

7. The method according to claim 1, wherein the Q-components of said reserved frequencies or tones of the second subset are a mirrored version of the I-components of said reserved frequencies or tones of the first subset.

8. The method according to claim 1, wherein the Q-components of said reserved frequencies or tones of the second subset are an offset version of the I-components of said reserved frequencies or tones of the first subset.

9. The method according to claim 1, wherein the step of generating said first peak reduction signal and said second peak reduction signal further comprises extracting at least one overshooting part of said input-main multi-carrier signal exceeding a predetermined threshold.

10. An apparatus for limiting local bandwidth impairment in a telecommunications system, comprising successive processing stages wherein tone reservation is used to reduce peak power of a multi-carrier signal, wherein each stage of said apparatus comprises:
    a first frequency or tone reservation unit adapted to generate a first peak reduction signal using reserved frequencies or tones of a first subset of frequencies or tones;
    a second frequency or tone reservation unit adapted to generate a second peak reduction signal using reserved frequencies or tones of a second subset of frequencies or tones;
    a component extractor adapted to extract the In-phase components, I-components, of said first peak reduction signal and adapted to extract the Quadrature components, Q-components, of said second peak reduction signal;
    a combiner adapted to generate a third peak reduction signal by adding or combining, in the frequency domain, the I-components of said first peak reduction signal and the Q-components of said second peak reduction signal.

11. The apparatus according to claim 10, wherein said stage further comprises, a peak reducer adapted to reduce at least one peak of said input multi-carrier signal exceeding a predetermined threshold level by generating an output signal through combination of said third peak reduction signal with said input main multi-carrier signal or a delayed version of said input main multi-carrier signal.

12. The apparatus according to claim 11, wherein said output signal is provided as said input main multi-carrier signal to a subsequent stage of said successive stages.

13. The apparatus according to claim 10, wherein data is carried on signal components of the reserved frequencies of said first subset and on signal components of the reserved frequencies of said second subset that are not used to generate said third peak reduction signal.

14. The apparatus according to claim 10, wherein the reserved frequencies or tones of said first subset and the reserved frequencies of said second subset are irregularly and randomly distributed.

15. The apparatus according to claim 10, wherein the distributions of the I-components of the first subset of frequencies or tones and the Q-components of the second subset of frequencies or tones are independently assigned.

16. The apparatus according to claim 10, wherein the Q-components of said reserved frequencies or tones of the second subset are a mirrored version of the I-components of said reserved frequencies or tones of the first subset.

17. The apparatus according to claim 10, wherein the Q-components of said reserved frequencies or tones of the second subset are offset version of the I-components of said reserved frequencies or tones of the first subset.

18. The apparatus according to claim 10, wherein said first frequency or tone reservation unit and said second frequency or tone reservation unit further comprises a peak extractor adapted to extract at least one overshooting part of the input main multi-carrier signal exceeding a predetermined threshold level.

19. A base station for a telecommunications system characterised in that it comprises an apparatus for limiting local bandwidth impairment according to claim 13.

* * * * *